(12) United States Patent
Koch et al.

(10) Patent No.: US 6,360,594 B1
(45) Date of Patent: Mar. 26, 2002

(54) NON-ATTACHED MONITORING ASSEMBLY FOR PNEUMATIC TIRE

(75) Inventors: Russell W. Koch, Hartville, OH (US); Paul B. Wilson, Murfreesboro, TN (US); Jack A. Dutcher, Mesa, AZ (US); Guy J. Walenga, Mt. Juliet, TN (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 0 days.

(21) Appl. No.: 09/608,425

(22) Filed: Jun. 30, 2000

Related U.S. Application Data

(63) Continuation-in-part of application No. 09/191,671, filed on Nov. 13, 1998, now Pat. No. 6,082,192.

(51) Int. Cl.[7] .......................... B60C 23/02; B60C 19/00
(52) U.S. Cl. ................................... 73/146.5; 152/152.1
(58) Field of Search ................................ 73/146.5, 146, 73/146.3, 146.8; 152/152.1, 154.1, 450, DIG. 5

(56) References Cited

U.S. PATENT DOCUMENTS

| | | | | |
|---|---|---|---|---|
| 2,222,047 A | * | 11/1940 | Sndyer ............... | 152/DIG. 5 |
| 4,067,235 A | | 1/1978 | Markland et al. .......... | 73/146.5 |
| 4,169,497 A | * | 10/1979 | Tsuruta ....................... | 152/418 |
| 4,343,338 A | * | 8/1982 | Hart ........................... | 152/153 |
| 5,081,443 A | | 1/1992 | Breit .......................... | 340/426 |
| 5,679,187 A | * | 10/1997 | Price .......................... | 152/415 |
| 5,938,868 A | * | 8/1999 | Miura ...................... | 152/331.1 |
| 6,025,777 A | | 2/2000 | Fuller et al. ................ | 340/442 |

* cited by examiner

Primary Examiner—Benjamin R. Fuller
Assistant Examiner—Aw-Musse Abdullahi
(74) Attorney, Agent, or Firm—Thomas R. Kingsbury; Michael Sand; John H. Hornickel

(57) ABSTRACT

A monitoring assembly for a pneumatic tire includes an electronic monitoring device having at least one sensor disposed in a protective body. The monitoring assembly is configured to float on a variety of liquids that are typically disposed within a tire. The protective body is liquid-tight and includes an encapsulation layer that encapsulates the substrate and sensors, a cushion, and a skin on the outside of the cushion. The protective body is substantially spherical allowing the assembly to roll about the inside of a tire without being permanently connected to the tire. The monitoring assembly is simply placed in a tire before the tire is mounted on a vehicle rim and allowed to move about loosely in the tire chamber when the tire is in use.

22 Claims, 5 Drawing Sheets

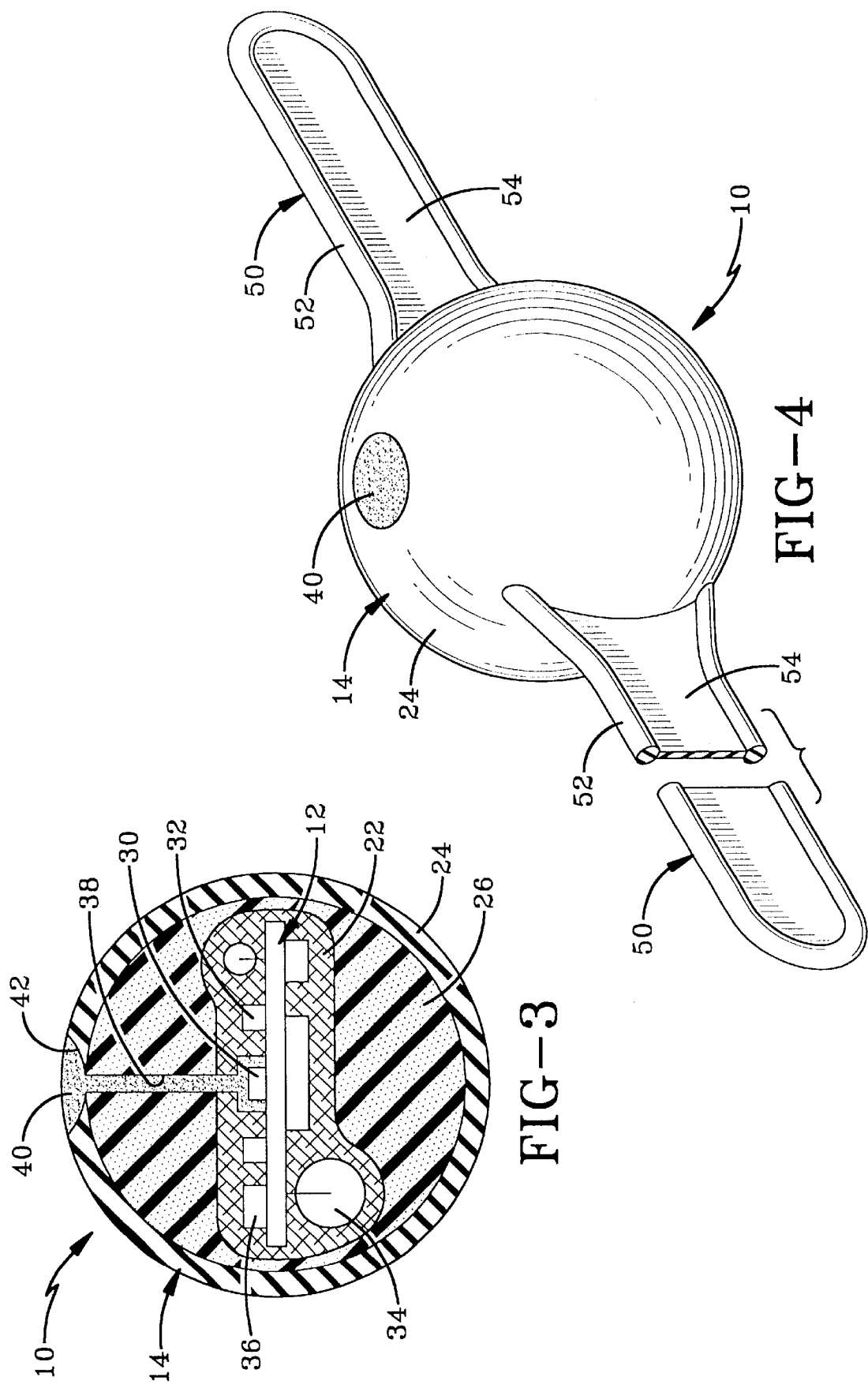

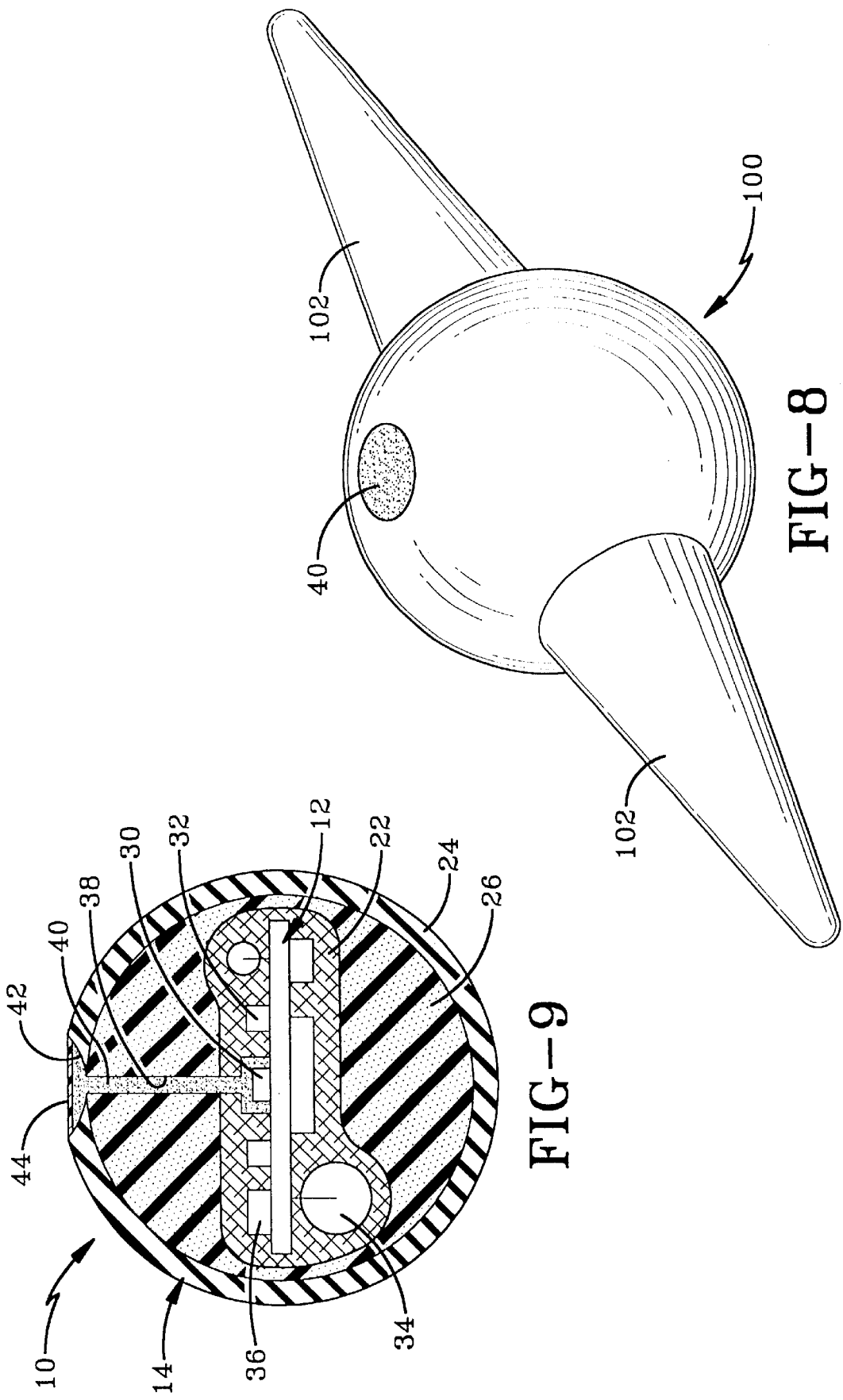

NON-ATTACHED MONITORING ASSEMBLY FOR PNEUMATIC TIRE

CROSS REFERENCE TO RELATED APPLICATIONS

This application is a continuation-in-part application of currently-pending U.S. patent application Ser. No. 09/191,671 filed Nov. 13, 1998 now U.S. Pat. No. 6,082,192, the disclosures of which are incorporated herein by reference.

BACKGROUND OF THE INVENTION

1. Technical Field

The present invention generally relates to pneumatic tires and devices for monitoring the conditions of the tires. More particularly, the present invention is related to a radio frequency active monitor assembly that is housed in a protective body that is placed in a tire and is free to move about while the tire is in use with nothing connecting the monitor assembly to the tire or tire rim. Specifically, the present invention relates to a monitoring device for a pneumatic tire that is housed in a substantially spherical protective body. The spherical body is placed loosely between a tire and a tire rim when the tire is mounted on the tire rim and allowed to freely move about the inside of the tire.

2. Background Information

Monitoring conditions of pneumatic tires while they are installed and in use on a particular vehicle is desired in the art. The users of this technology particularly desire to measure the internal temperature and internal pressure of a tire. These measurements are preferably capable of being taken while the tire is in use without having to remove the tire from the vehicle or otherwise interrupt the use of the vehicle to take the measurements. It is particularly desirable to monitor the conditions and statistics of large off-the-road truck tires because the off-the-road tires are expensive and subject to harsher conditions than typical passenger car tires. The off-the-road tires on large trucks and other vehicles must be regularly maintained to maximize vehicle and tire efficiency.

Numerous types of monitoring devices are known in the art. One type of known monitoring device uses a passive integrative circuit embedded within the body of the tire that is activated by a radio frequency transmission that energizes the circuit by inductive magnetic coupling. Other prior art devices used for monitoring tire conditions include self-powered circuits that are positioned external of the tire, such as at the valve stem. Other active, self-powered programmable electronic devices are disclosed in U.S. Pat. Nos. 5,500,065, 5,573,610, 5,562,787, and 5,573,611 which are assigned to the Assignee of the present application.

One problem common to each of these monitoring devices is the problem of attaching the monitoring device to the tire with a stable and lasting attachment. The attachment problem is difficult when the monitoring device is attached to the inside of the tire, the outside of the tire, or embedded within the body of the tire. The mounting configuration must maintain the integrity of the tire. Mounting the device to the rim also creates problems. The rim may be damaged, tool must be created, and the mounting configuration must prevent air from leaking from the tire. Each of these locations creates different problems with the attachment process as well as the manufacturing process of the tire. It is generally undesirable to provide an attachment configuration that requires re-tooling or any re-directing of the existing tire manufacturing lines. It is thus desired in the art to provide a monitoring device for a pneumatic tire that obviates the attachment problems inherent with the prior art monitoring devices.

The prior art attachment problems exist because the forces on an electronic monitoring device while connected to a pneumatic tire are significant and numerous. The forces in the footprint area of the tire must be considered when mounting a monitoring device. Tires are subject to rotational forces when the vehicle is moving and also to various impact forces when the tire contacts bumps or surface irregularities. The attachment of the monitoring device to the tire must be strong enough and secure enough to maintain the position of the monitoring device with respect to the tire while experiencing all of these forces while also protecting the monitoring device from damage resulting from these forces. These concerns have lead to the encapsulation of the monitoring devices and numerous methods of attaching the monitoring device to the internal wall of a tire.

The attachment of the monitoring device to the internal wall of the tire requires the tire to be balanced about its rotational axis prior to use. The monitoring device itself adds weight to the tire and the attachments known in the art add further weight to the tire requiring the tire to be counterbalanced. It is thus desired to provide a monitoring device that may be used with a tire without requiring the tire to be counterbalanced.

Another significant problem experienced with attaching a monitoring device to a pneumatic tire is that the surface of the tire where the monitoring device is typically anchored is not stable. Tires are designed to flex and stretch to accommodate various pressures and forces. The attachment of the monitoring device to the tire must accommodate the movement and stretching of the tire surface where the monitoring device is connected. Such accommodation must last throughout the life of the tire and function at a wide range of temperatures and pressures. It is thus desired in the art to provide a monitoring device that may be used with a pneumatic tire without being connected to one of the tire surfaces that flexes and stretches.

Another problem in the art is that off-the-road tires typically have water or another liquid in the bottom of the tire. One type of liquid typically placed in tires is a sealant sold under the Federally Registered Trademark Tire Life by Fuller Bros., Inc. of Portland, Oreg. The monitoring device of the invention must be able to operate in a wet environment. Monitoring devices submerged in a liquid will likely have impaired transmission performance and data may be lost because of the position of the device in the tire.

SUMMARY OF THE INVENTION

In view of the foregoing, it is an objective of the present invention to provide a monitoring assembly for a pneumatic tire that may be monitored from the outside of the tire while the tire is mounted on a tire rim and while the vehicle is in use.

Another objective of the present invention is to provide a monitoring assembly for a pneumatic tire that is placed within the tire but is not connected to the tire or tire rim allowing the monitoring device to move about freely inside the tire.

Still another objective of the present invention is to provide a monitoring assembly for a pneumatic tire wherein the use of the monitoring device does not require modification to the structure of the tire.

Another objective of the present invention is to provide a monitoring assembly for a pneumatic tire that may be added to the tire just before the tire is mounted on a tire rim such that the monitoring device may be installed and used without modification to existing tire assembly lines.

A further objective of the present invention is to provide a monitoring assembly for a pneumatic tire that may be used with existing tires.

Still a further objective of the present invention is to provide a monitoring assembly for a pneumatic tire that includes wings that orient the monitoring device with respect to the tire so that the antenna of the monitoring device may establish a reliable communication between the monitoring device and a data gathering device outside of the tire.

A further objective of the present invention is to provide a monitoring assembly for a pneumatic tire that includes a pressure sensor that is capable of sensing the internal pressure of the tire.

Another objective of the present invention is to provide a monitoring assembly for a pneumatic tire that allows a pressure sensor to function while reducing the risk that the pressure sensor malfunctions by filling the breathing tube of the monitoring device with a transfer gel.

Another objective of the present invention is to provide a monitoring assembly for a pneumatic tire that protects the sensitive electronic equipment of the monitoring device in a protective body that has a series of layers including a cushioned layer that absorbs impact forces.

Another objective of the present invention is to provide a monitoring assembly for a pneumatic tire that has an exterior shape allowing it to easily and relatively smoothly move about the inner chamber of a tire.

An additional objective of the present invention is to provide a monitoring assembly for a pneumatic tire that is of simple construction, that achieves the stated objectives in a simple, effective, and inexpensive manner, that solves the problems, and that satisfies the needs existing in the art.

Another objective of the invention is to provide a monitoring device that will operate in a wet environment.

Another objective of the invention is to provide a monitoring device that will float on a wide variety of liquids.

These and other objectives and advantages of the present invention are achieved by the combination of a pneumatic tire and a monitoring assembly. The combination includes a pneumatic tire having a body mounted on a rim to form a chamber between the body and said rim; a liquid disposed in the pneumatic tire, the liquid having a specific gravity; the monitoring assembly being loosely disposed within the chamber whereby the monitoring assembly moves freely within said chamber being restrained only by said tire body and the rim; and the monitoring assembly having a specific gravity less than the specific gravity of the liquid such that the monitoring assembly will float in the liquid.

Other objectives and advantages of the invention are achieved by a monitoring assembly for use in a pneumatic tire. The assembly includes at least one sensor for detecting an engineering condition of a tire; a protective body surrounding the sensor; the protective body having sufficient curvature enabling said body to roll on the inside of the tire; and the combination of the protective body and the sensor having a specific gravity less than 1 so that the monitoring assembly will float on liquids having a specific gravity of 1 and higher.

BRIEF DESCRIPTION OF THE DRAWINGS

The preferred embodiments of the invention, illustrative of the best modes in which applicants contemplate applying the principles of the invention, are set forth in the following description and are shown in the drawings and are particularly and distinctly pointed out and set forth in the appended claims.

FIG. 3 is a sectional view of the monitoring device of FIG. 2, the sectional view taken through a portion of the monitoring device assembly including the breathing tube;

FIG. 4 is a perspective view, portions of which are broken away and in section, of a modified embodiment of the monitoring device of FIG. 2;

FIG. 8 is a perspective view of a modified embodiment of the monitoring device of FIG. 2;

FIG. 9 is a view similar to FIG. 3 showing an alternative embodiment of the breathing tube configuration;

Similar numbers refer to similar elements throughout the specification.

DESCRIPTION OF THE PREFERRED EMBODIMENTS

Figure 1:
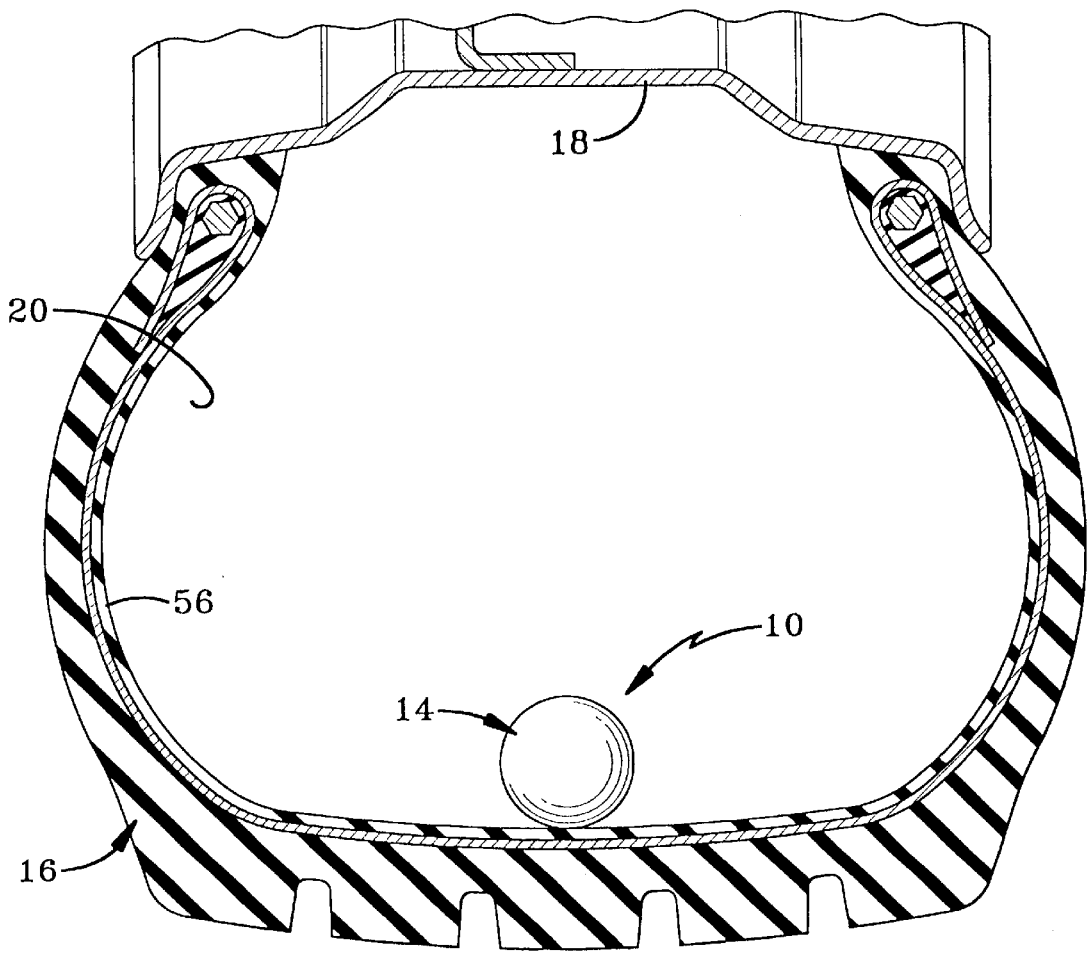
FIG. 1 is a sectional view of a pneumatic tire mounted on a rim having the monitoring device assembly of the present invention located in the chamber between the tire body and the rim.
Figure 2:
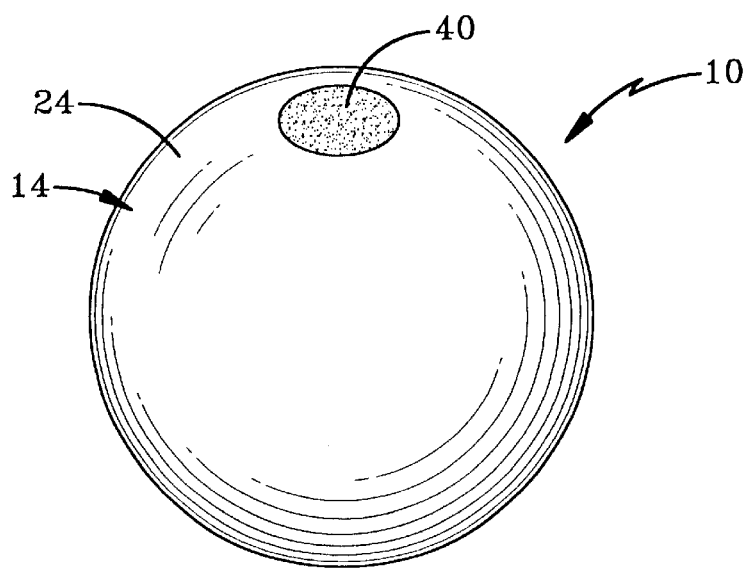
FIG. 2 is an enlarged perspective view of the monitoring device assembly of FIG. 1 removed from within the tire.

The monitoring assembly of the present invention is indicated generally by the numeral 10 in the accompanying drawings. Monitoring assembly 10 generally includes a radio frequency, active, electronic monitoring device 12 surrounded by a protective body 14. Device 12 may be of the type shown in U.S. Pat. No. 5,500,065, the contents of which are incorporated herein by reference, or could be of other configurations and operations without effecting the concepts of the present invention. Assembly 10 is used simply by placing it inside a tire 16 such that assembly 10 is trapped between tire 16 and the rim 18 on which the tire is mounted. Assembly 10 is free to move about a pressurized air chamber 20 formed between tire 16 and rim 18 with only the body of tire 16 and rim 18 stopping or limiting the movement of assembly 10.

In accordance with one of the objectives of the present invention, assembly 10 may be simply placed in tire 16 before the tire is mounted on rim 18. This method of combining assembly 10 with tire 16 allows the assembly to be used with existing tires, allows assembly 10 to be used with different tires, and does not require the tire manufacturing line to be reconfigured to add assembly 10 to a specific tire.

The use of assembly 10 may be particularly useful in large off-the-road tires that do not rotate at a high rate of speed but could also be used in truck and passenger tires if desired. Off-the-road tires are typically large and have relatively thick side walls. Monitoring assembly 10 will rest at the bottom of tire 16 as shown in FIG. 1 when tire 16 is rotating slowly about its rotational axis. Monitoring assembly 10 may rock back and forth as tire 16 rotates and experiences bumps but will not spin about the rotational axis of tire 16 at lower speeds. In these situations, monitoring assembly 10 would not experience significant impact or shock forces that would tend to damage electronic active monitoring device 12. When tire 16 rotates faster, there may be sufficient friction and forces between protective body 14 and tire 16 to cause monitoring assembly 10 to rotate about the rotational axis of tire 16 as if it was fixed to the inner surface of the tire. Protective body 14 is formed in a shape, such as the substantially spherical shape depicted in the drawings, that allows assembly 10 to roll about the interior of tire 16. Protective body 14 is shaped to prevent the movement of monitoring assembly 10 about the interior of tire 16 from causing additional forces to be exerted on electronic monitoring device 12 and to tire 16. For instance, protective body 14 may be formed in any of the shapes depicted in FIGS. 7A–7D.

In accordance with another objective of the present invention, protective body 14 includes an encapsulation layer 22, an outer skin 24, and a cushion 26 disposed between skin 24 and encapsulation layer 22 as shown in FIG. 3. Encapsulation layer 22 may be formed from a substantially rigid encapsulation material such as a hard plastic, epoxy, or rubber. Encapsulation layer 22 is configured to maintain the position of each of the elements of electronic monitoring device 12 when monitoring assembly 10 is loosely moving about chamber 20 while tire 16 is in use. Cushion 26 preferably is fabricated from a foam or a soft rubber and provides a shock absorber to assembly 10. The foam is preferably resilient. As can be seen in FIG. 3, the thickness of cushion 26 varies so that the internal surface of cushion 26 matches the exterior surface of encapsulation layer 22, while the external surface of cushion 26 is substantially spherical. Skin 24 provides a durable, protective layer to monitoring assembly 10 and may be fabricated from a substantially durable rubber or plastic that is fixed to cushion 26 by a suitable adhesive or by curing the materials together. In one embodiment of the present invention, skin 24 has an external diameter of about 2 inches to about 2½ inches. Obviously, other sizes of assembly 10 are contemplated by the present invention.

Electronic monitoring device 12 preferably is an active monitoring device that includes at least one sensor such as a pressure sensor 30. Other sensors may include a thermometer 32 for measuring the internal temperature of tire 16. Electronic monitoring device 12 may further include a battery 34 that powers a central processing unit (CPU) 36 that both drives and monitors the other sensors of device 12. Numerous types of electronic monitoring devices are known in the art and the specific configuration described is not to limit the application of the present invention.

Pressure sensor 30 must be exposed to the pressure of the surrounding atmosphere in chamber 20 for it to provide useful information. A breathing tube 38 thus is provided through encapsulation layer 22, cushion 26, and skin 24. Breathing tube 38 preferably is formed during the fabrication of monitoring assembly 10 or may be formed after assembly 10 has been fabricated. Breathing tube 38 may be empty to provide direct fluid communication between pressure sensor 30 and the surrounding atmosphere. In another embodiment of the present invention, breathing tube 38 is filled with a transfer gel 40 that has a one-to-one transfer ratio so that pressure sensor 30 senses the pressure change in transfer gel 40 which, in turn, senses and experiences pressure changes in the atmosphere of chamber 20 that surrounds monitoring assembly 10. Transfer gel 40 prevents breathing tube 38 from being clogged with debris such as dust, rubber shavings, or grease that may be present in chamber 30 or on rim 18. An indentation 42 is provided in skin 24 to give transfer gel 40 more surface area that is exposed to the atmosphere surrounding monitoring assembly 10. In another embodiment of the invention, a flexible diaphragm 44 (FIG. 9) covers breathing tube 38 to prevent transfer gel 40 from becoming contaminated.

Figure 5:
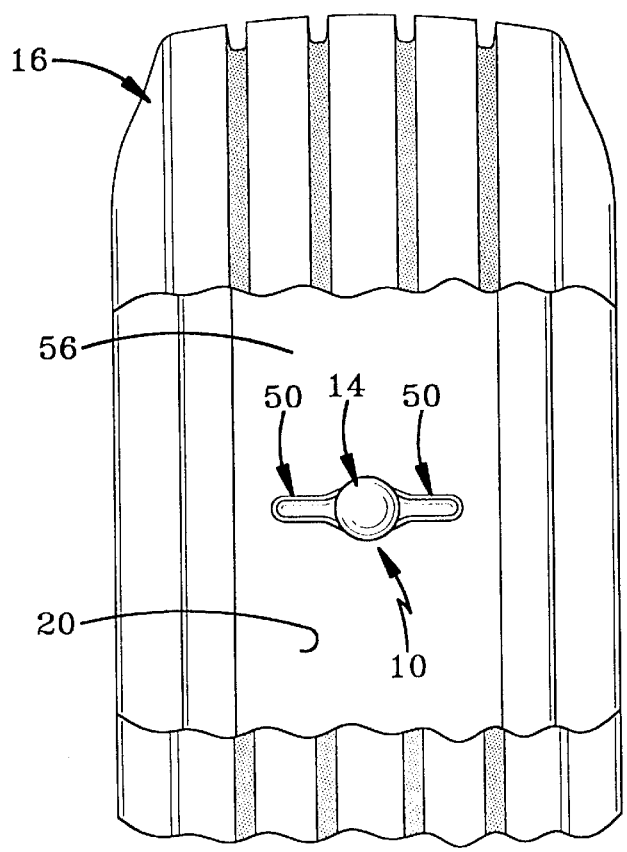
FIG. 5 is a diagrammatic plan view with portions broken away showing the modified monitoring device assembly of FIG. 4 located in a pneumatic tire with the rim removed.
Figure 7A:
FIGS. 7A–7D schematically depict alternative protective body shapes for the monitoring assembly of the present invention.
Figure 7B:
Figure 7C:
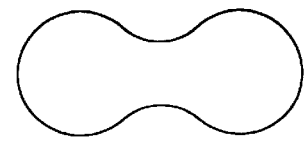
Figure 7D:
Figure 6:
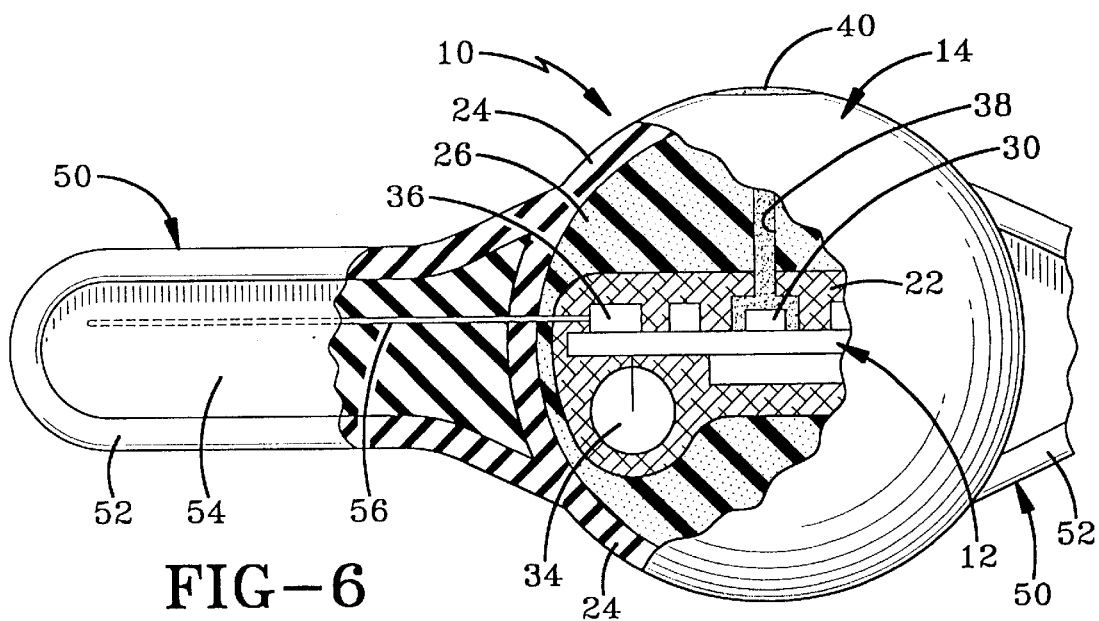
FIG. 6 is a fragmentary view with portions broken away and in section of a further modified monitoring device assembly from that of FIG. 4.

In accordance with another objective of the present invention, monitoring assembly 10 may be provided with a pair of wings 50 that extend from substantially opposite sides of protective body 14 as shown in FIG. 4. Wings 50 help maintain the alignment of assembly 10 in tire 16 when the tire is in use. The proper alignment of assembly 10 within the tire provides a strong reliable signal between electronic monitoring device 12 and a data gathering machine (not shown) positioned outside of tire 16. In one embodiment of the present invention, each wing 50 is formed from the same material as skin 24 and includes a circumferential stiffening rib 52 and an intervening webbing 54. Wings 50 may also be fabricated from a material that is substantially the same or the same as the material of an innerliner 56 of tire 16. In still other embodiments of the present invention, wings 50 may be reinforced with rigid plastic member or other types of reinforcements. As discussed above, wings 50 help maintain the alignment of monitoring assembly 10 within tire 16 in order to provide a more efficient transmission signal therefrom. As shown in FIG. 5, wings 50 will help align monitoring assembly 10 such that each wing 50 extends in a direct substantially parallel to the rotational axis of tire 16.

In accordance with another objective of the present invention, an antenna 56 may extend from CPU 36 or another location of electronic monitoring device 12 through encapsulation layer 22, through cushion 26, through skin 24, and into wing 50. The extension of antenna 56 into wing 50 allows it to more easily communicate with a data gathering device (again not shown) outside of tire 16 and allows antenna 56 to be ideally configured to transfer strong signals. In addition, the placement of antenna 56 in wing 50 allows the configuration and alignment of antenna 56 to be predictable so that the corresponding antenna on the data gathering device may be ideally aligned to communicate with antenna 56. Another embodiment of the invention is depicted in FIG. 8 with monitoring assembly 100 having a pair of wings 102 that are conically-shaped.

Figure 10:
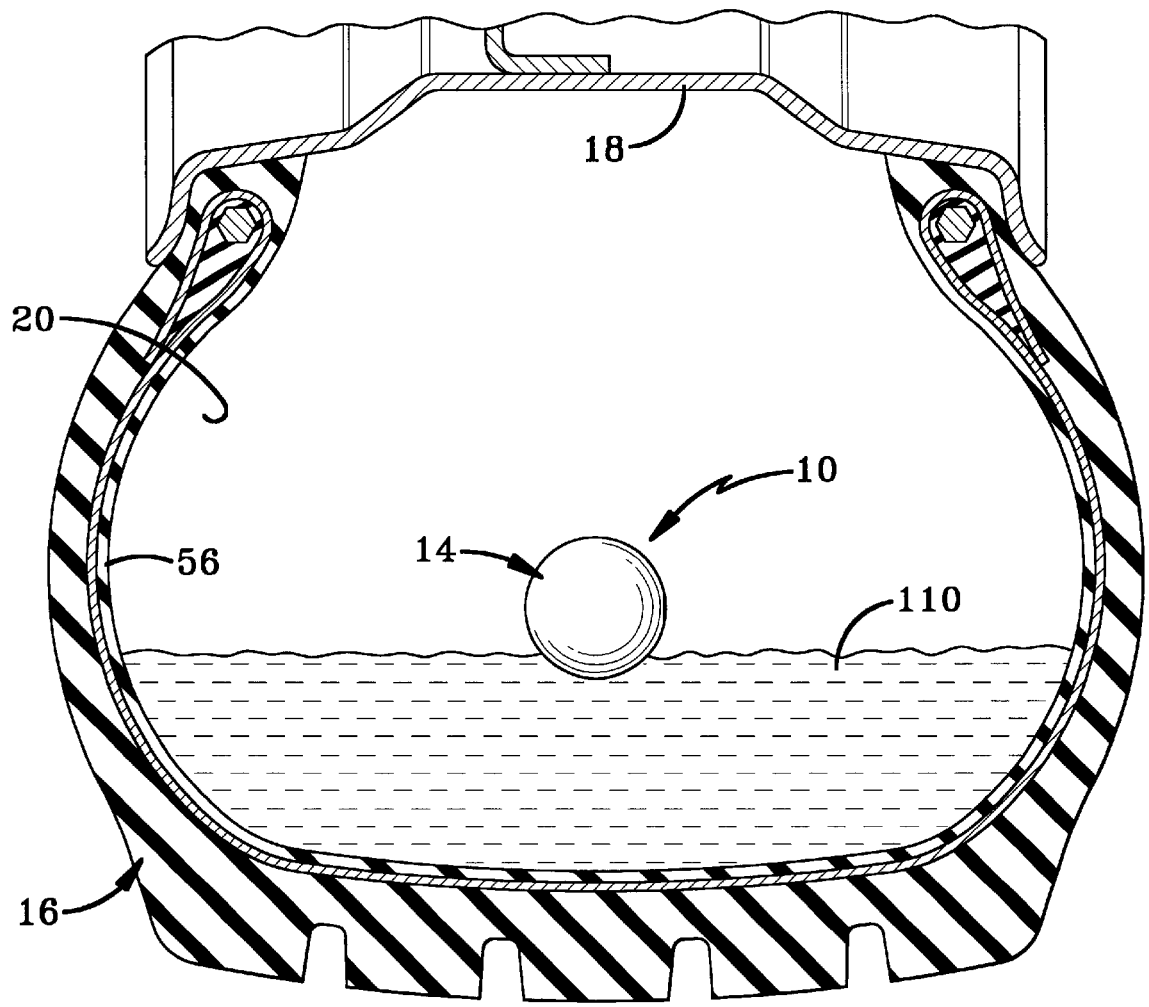
FIG. 10 is a view similar to FIG. 1 showing the monitoring assembly floating in liquid disposed within the tire.

In accordance with other objectives and advantages of the invention, monitoring assembly 10 is configured to be liquid-tight and float (FIG. 10) on a variety of liquids 110 such as water, Tire Life®, or other liquids. Most liquids 110 disposed within tire 16 will have a specific gravity of 1 or higher. As such, the specific gravity of assembly 10 must be less than 1 in these embodiments. Assembly 10 may be configured to float by fabricating protective body 14 entirely from materials that float or by trapping a sufficient amount of air within protective body 14 to cause assembly 10 to float.

In accordance with another objective of the invention, protective body 14 is fluid-tight to prevent fluid from entering protective body 14 when assembly 10 is floating in liquid.

Assembly 10 has a longer life when it floats on the upper surface of liquid 110 and the transmissions to and from tire 16 are improved when assembly 10 is not surrounded by liquid 110. Wings 50 or 102 also function in liquid 110 to consistently position assembly 10 within tire 16.

Accordingly, the improved monitoring assembly for a pneumatic tire is simplified, provides an effective, safe, inexpensive, and efficient device that achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the monitoring assembly of the present invention is constructed and used, the characteristics of the construction, and the advantageous new and useful results obtained; the new and useful structures, devices, elements, arrangements, parts, and combinations are set forth in the appended claims.

What is claimed is:

1. In combination, a pneumatic tire and a monitoring assembly;
    said pneumatic tire having a body mounted on a rim to form a chamber between said body and said rim;
    a liquid disposed in the chamber of the pneumatic tire, the liquid having a specific gravity;
    said monitoring assembly being loosely disposed within said chamber to allow said monitoring assembly move freely within said chamber and being restrained only by said tire body and said rim; and
    said monitoring assembly having a specific gravity less than the specific gravity of said liquid such that said monitoring assembly will float in said liquid.

2. The combination of claim 1, wherein said monitoring assembly includes an electronic monitoring device.

3. The combination of claim 2, wherein said electronic monitoring device includes a pressure sensor.

4. The combination of claim 3, wherein said electronic monitoring device is surrounded by a liquid-tight protective body.

5. The combination of claim 4, wherein said protective body includes a breathing tube that provides communication between said pressure sensor and the atmosphere surrounding said protective body.

6. The combination of claim 5, further comprising a transfer gel substantially filling said breathing tube.

7. The combination of claim 6, further comprising a diaphragm extending across said breathing tube.

8. The combination of claim 4, wherein said protective body includes an encapsulation layer adjacent said monitoring device.

9. The combination of claim 8, wherein said encapsulation layer is formed from a substantially rigid encapsulation material.

10. The combination of claim 9, wherein said encapsulation material is an epoxy.

11. The combination of claim 8, wherein said protective layer further includes a cushion layer surrounding said encapsulation layer.

12. The combination of claim 11, wherein said cushion material is a soft rubber.

13. The combination of claim 11, wherein said cushion material is a foam.

14. The combination of claim 11, wherein said protective layer further includes a skin layer substantially surrounding said cushion layer.

15. The combination of claim 1, further comprising a pair of wings extending outwardly from said monitoring assembly.

16. The combination of claim 15, further comprising an antenna connected to said monitoring assembly, said antenna disposed in at least one of said wings.

17. A wheel for a vehicle, comprising:
    a pneumatic tire;
    a rim;
    the pneumatic tire mounted on the rim to form a chamber between the tire and the rim;
    a liquid disposed in the chamber between the tire and the rim, the liquid having a specific gravity;
    a monitoring assembly being loosely disposed within the chamber whereby the monitoring assembly moves freely within the chamber; and
    the monitoring assembly having a specific gravity less than the specific gravity of the liquid such that the monitoring assembly will float in the liquid.

18. The wheel of claim 17, wherein the monitoring assembly includes an electronic monitoring device.

19. The wheel of claim 18, wherein the electronic monitoring device includes a pressure sensor.

20. The wheel of claim 19, wherein the electronic monitoring device is surrounded by a liquid-tight protective body.

21. The wheel of claim 17, wherein the monitoring assembly includes a cushion material adapted to protect the monitoring assembly.

22. In a pneumatic tire mounted to a rim to form a chamber between the tire and the rim; a liquid disposed in the pneumatic tire between the tire and the rim; the liquid having a specific gravity; a monitoring assembly disposed in the tire between the tire and the rim; the improvement comprising the monitoring assembly having a specific gravity less than the specific gravity of the liquid so that the monitoring assembly will float in the liquid.

* * * * *